(12) United States Patent
Golden et al.

(10) Patent No.: US 11,034,898 B2
(45) Date of Patent: Jun. 15, 2021

(54) METHOD AND APPARATUS FOR PREVENTING COKE FORMATION IN THE REACTOR VAPOR FEED NOZZLE OF A FLUID CATALYTIC CRACKING UNIT (FCCU) MAIN FRACTIONATOR COLUMN

(71) Applicant: PROCESS CONSULTING SERVICES, INC, Houston, TX (US)

(72) Inventors: Scott William Golden, Phillips, ME (US); Anthony Frederick Barletta, Jr., Houston, TX (US); Grant Joseph Niccum, Houston, TX (US)

(73) Assignee: PROCESS CONSULTING SERVICES, INC., Houston, TX (US)

( * ) Notice: Subject to any disclaimer, the term of this patent is extended or adjusted under 35 U.S.C. 154(b) by 0 days.

(21) Appl. No.: 16/591,193

(22) Filed: Oct. 2, 2019

(65) Prior Publication Data

US 2020/0102512 A1    Apr. 2, 2020

Related U.S. Application Data

(60) Provisional application No. 62/740,222, filed on Oct. 2, 2018.

(51) Int. Cl.
| | |
|---|---|
| *B01J 4/00* | (2006.01) |
| *B01D 3/14* | (2006.01) |
| *B01D 3/32* | (2006.01) |
| *C10G 75/00* | (2006.01) |
| *B01D 3/42* | (2006.01) |
| *C10G 11/20* | (2006.01) |

(52) U.S. Cl.
CPC .............. *C10G 75/00* (2013.01); *B01D 3/14* (2013.01); *B01D 3/32* (2013.01); *B01D 3/4294* (2013.01); *B01J 4/002* (2013.01); *B01J 4/005* (2013.01); *C10G 11/20* (2013.01)

(58) Field of Classification Search
None
See application file for complete search history.

(56) References Cited

U.S. PATENT DOCUMENTS

| | | | | | |
|---|---|---|---|---|---|
| 4,776,948 | A | * | 10/1988 | Skraba .................. | B01D 3/322 203/90 |
| 5,069,830 | A | * | 12/1991 | Moore .................. | B01J 19/305 261/94 |
| 5,632,933 | A | * | 5/1997 | Yeoman .................. | B01D 3/32 261/109 |

(Continued)

FOREIGN PATENT DOCUMENTS

WO    WO-2008020053 A2 *    2/2008    .............. C10G 7/00

*Primary Examiner* — Jennifer A Leung
(74) *Attorney, Agent, or Firm* — Patterson & Sheridan, L.L.P.

(57) ABSTRACT

The present disclosure generally relates to method and apparatus for preventing coke formation in reactor vapor feed nozzle of a fractionator column of a fluid catalytic cracking unit. One or more baffles are positioned within the fractionator column to prevent effluent vapor that is directed by the reactor vapor feed nozzle into the feed zone from flowing back into the reactor vapor feed nozzle. The reactor vapor feed nozzle itself, or an internal nozzle coupled to the reactor vapor feed nozzle, may extend at least partially into the feed zone to similarly act as a baffle.

19 Claims, 15 Drawing Sheets
(1 of 15 Drawing Sheet(s) Filed in Color)

(56) References Cited

U.S. PATENT DOCUMENTS

| | | | | |
|---|---|---|---|---|
| 6,193,849 B1* | 2/2001 | Lockett, Jr. | ............ | B01D 3/009 |
| | | | | 196/127 |
| 8,888,076 B2* | 11/2014 | Tamminen | ............. | B01D 45/08 |
| | | | | 261/96 |

* cited by examiner

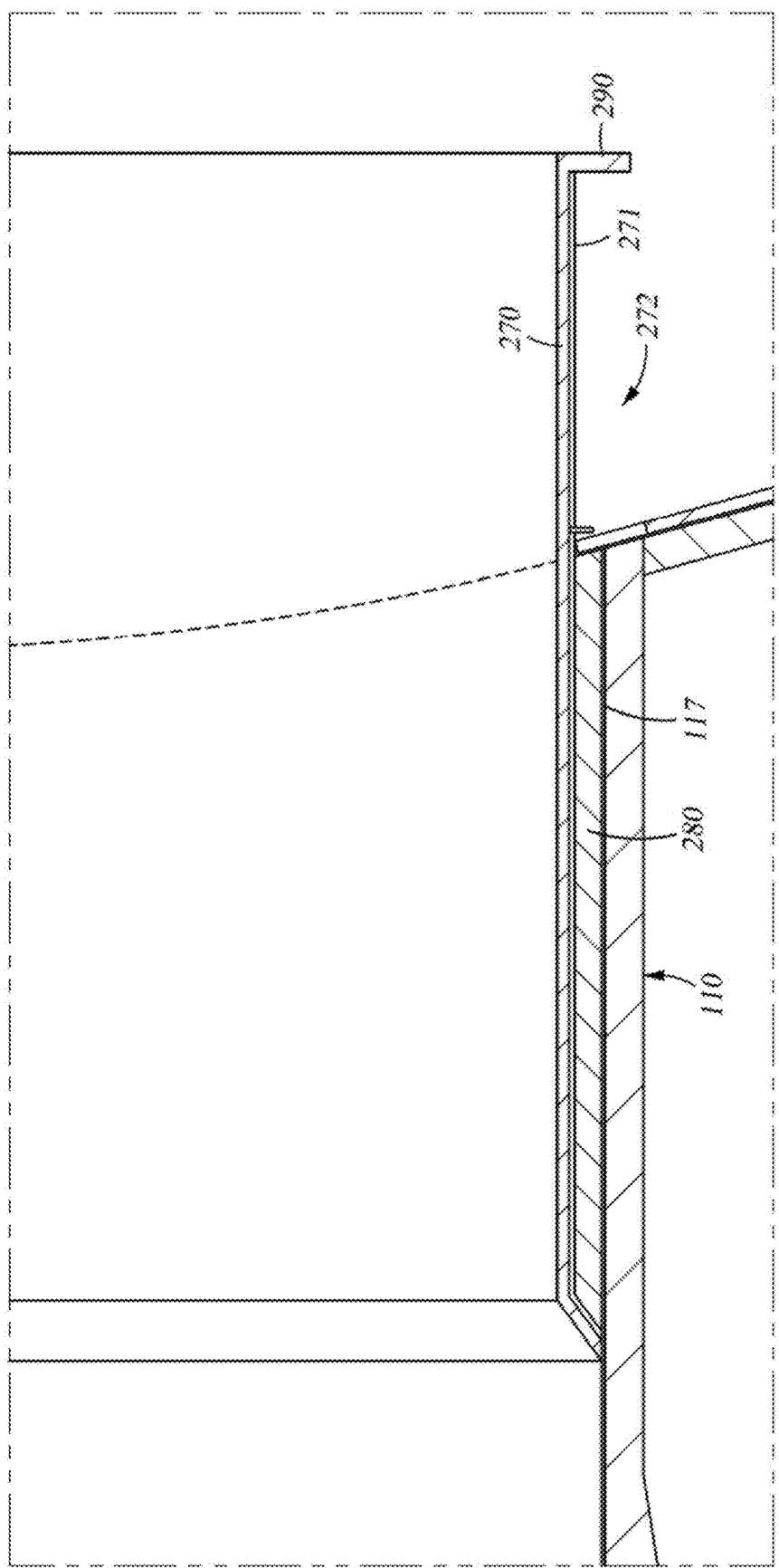

METHOD AND APPARATUS FOR PREVENTING COKE FORMATION IN THE REACTOR VAPOR FEED NOZZLE OF A FLUID CATALYTIC CRACKING UNIT (FCCU) MAIN FRACTIONATOR COLUMN

CROSS-REFERENCE TO RELATED APPLICATIONS

This application claims benefit of U.S. provisional patent application Ser. No. 62/740,222, filed Oct. 2, 2018, which is herein incorporated by reference in its entirety.

BACKGROUND

Field

Embodiments of the present disclosure generally relate to reduction of coke formation in a fluid catalytic cracking unit. More specifically, method and apparatus for reduction of coke formation in a reactor vapor feed nozzle are disclosed.

Description of the Related Art

Oil refineries use fluid catalytic cracking units to convert heavy crude oil into lighter products such as liquefied petroleum gas, gasoline, and light cycle oil through a catalytic cracking process. The fluid catalytic cracking unit generally comprises three main vessels: a reactor, a catalyst regenerator, and a fractionator. In the catalytic cracking process, fine catalysts are fluidized and circulated between the reactor and the catalyst regenerator.

In a riser line leading to the reactor, the heavy crude oil mixes with hot, regenerated catalyst at a temperature of about 900 degrees Fahrenheit to about 1100 degrees Fahrenheit. The mixing process vaporizes the gas oil, or alternatively resid, and separates large hydrocarbon molecules into smaller hydrocarbon molecules through catalytic and thermal cracking. Most of the separation of the large hydrocarbon molecules occurs within the riser line. The reactor contains one or more cyclone separators that separate the spent catalyst from the hydrocarbon vapors. The spent catalyst is transferred to the catalyst regenerator via a stripping section in the bottom of the reactor. In the catalyst regenerator, coke is burned off the catalyst, enabling the catalyst to be reused in the riser line.

The hydrocarbon vapors exit the reactor via a transfer line fluidly coupled with a feed zone of the fractionator via a reactor vapor feed nozzle located near the bottom of the fractionator. A bottoms liquid level is located below the feed zone of the fractionator. Various column sections for condensing, fractionating, and collecting the different hydrocarbon products are located above the feed zone. These various column sections may utilize structured packing, trays, or a combination of the two to accomplish the necessary heat and mass transfer.

Coke formation and buildup (referred to as "coking") is a common cause of fluid catalytic cracking unit reliability problems. Coking typically occurs within and around the reactor vapor feed nozzle that leads into the fractionator. Coking increases pressure drop between the reactor and the fractionator by partially or completely blocking the hydrocarbon vapor flow into the fractionator. The obstructed hydrocarbon vapor flow due to coking results in a higher reactor operating pressure, which decreases the conversion rate of the large hydrocarbon molecules into smaller hydrocarbon molecules. Additionally, coking results in lower fractionator operating pressure, thereby decreasing the operating capacity of the fractionator by imposing main column condensing limits, lowering wet gas compressor inlet pressure, and/or reaching compressor capacity or motor horsepower limits.

Coking within and around the reactor vapor feed nozzle may form a coke ring. The coke ring forms starting at the inside wall of the reactor vapor feed nozzle and progresses radially into the reactor vapor feed nozzle. Coke rings can reach thicknesses of greater than 18 inches, can block more than 30 percent of nozzle area, and have been measured to impose up to 5 pounds per square inch of pressure drop. Fluid catalytic cracking units have been taken offline for maintenance to remove the coke ring and restore the unit to full capacity, resulting in reduced production capabilities.

Therefore, there is a need for new and/or improved methods and apparatus for preventing coking in fluid catalytic cracking units.

SUMMARY

Embodiments of the present disclosure provide methods and apparatus for reduction of coke formation in a reactor vapor feed nozzle.

In one embodiment, the method includes receiving an effluent vapor from a reactor into a fractionator, flowing the effluent vapor to a feed zone of the fractionator via a reactor vapor feed nozzle, and blocking effluent vapor condensation from entering the reactor vapor feed nozzle, thereby preventing coke formation in the reactor vapor feed nozzle.

In one embodiment, the apparatus comprises a fractionator column having a feed zone, a radially-oriented reactor vapor feed nozzle coupled to the fractionator to direct fluid vapor flow into the feed zone, and one or more baffles coupled to an inner surface of the fractionator and positioned relative to the reactor vapor feed nozzle to prevent fluid vapor flow back into the reactor vapor feed nozzle.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

FIG. 28 is an enlarged view of a portion of the reactor vapor feed nozzle of FIG. 27.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

The present disclosure generally relates to a fluid catalytic cracking unit configured for catalytic cracking processes. More specifically, the disclosure describes a method and apparatus for preventing coking and condensed hydrocarbon vapor flow back into a reactor vapor feed nozzle fluidly coupled with a fractionator of the fluid catalytic cracking unit. It is to be noted that only a portion of the fluid catalytic cracking unit is illustrated in the figures described herein, and other internal components such as spray headers, trays, and vortex breakers may be included.

Figure 1:
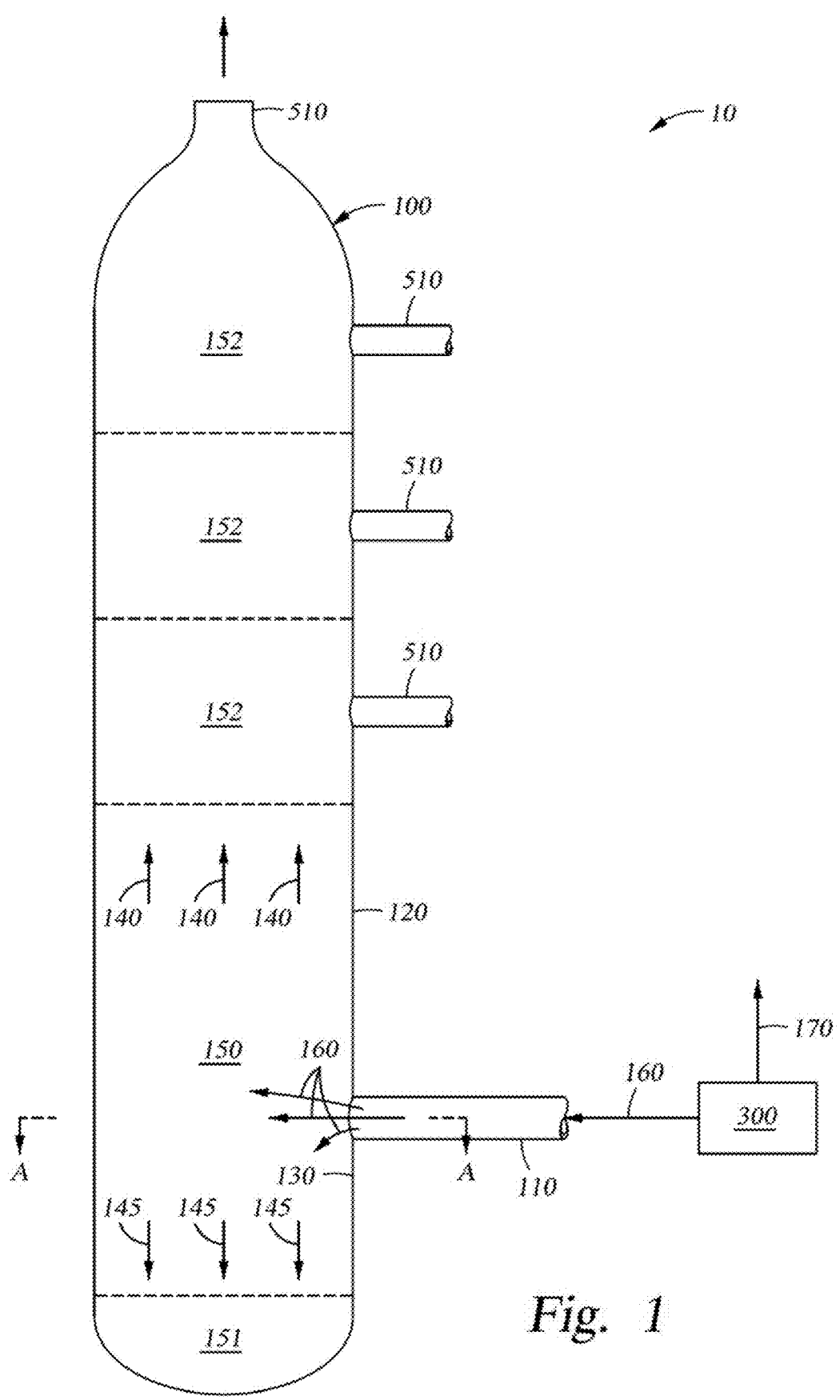
FIG. 1 is a side view of a Fluid Catalytic Cracking (FCC) unit according to one embodiment.

FIG. 1 is an illustration of a fluid catalytic cracking unit 10 comprising a reactor 300 that is in fluid communication with a reactor vapor feed nozzle 110, which directs effluent vapor 160, for example hydrocarbon vapor, into a fractionator 100, according to one embodiment. The reactor 300 is configured to separate spent catalyst 170 from the effluent vapor 160 and to direct the effluent vapor 160 to the fractionator 100 via the reactor vapor feed nozzle 110. The effluent vapor 160 may be at a temperature between about 850 degrees Fahrenheit to about 1150 degrees Fahrenheit as it flows into the fractionator 100. The velocity of the effluent vapor 160 may be within a range of about 70 feet per second to about 140 feet per second.

The fractionator 100 is a cylindrical vessel comprising an inner surface 130 and an outer surface 120. The interior of the fractionator 100 forms a feed zone 150 into which effluent vapor 160 is directed from the reactor vapor feed nozzle 110 that is coupled to the fractionator 100. Below the feed zone 150 is a bottoms liquid section 151 where liquids that condense out of the effluent vapor 160 can accumulate. Above the feed zone 150 are one or more packed or tray sections 152, including but not limited to a slurry pump-around, configured to condense, fractionate, distillate, and/or collect specific portions of the effluent vapor 160 from the remaining effluent vapor as it flows through the packed or tray sections.

The flow of the effluent vapor 160 enters the fractionator 100 into the feed zone 150. In the feed zone 150, liquids may condense out of the effluent vapor 160 and accumulate in the bottoms liquid section 151 as shown by arrows 145. Additionally, in the feed zone 150, remaining effluent vapor 160 begins to rise, as shown by arrows 140. Within the fractionator 100, the effluent vapor 160 goes through a process of distillation as it flows through the one or more packed or tray sections 152. Specific portions of the effluent vapor 160 are removed from the fractionator 100 through one or more outlets 510 coupled to the outer surface 120 of the fractionator 100 as the remaining effluent vapor 160 flows up towards the top of the fractionator 100. Excess effluent vapor 160 is removed from an outlet 510 positioned at the top of the fractionator 100.

Figure 2:
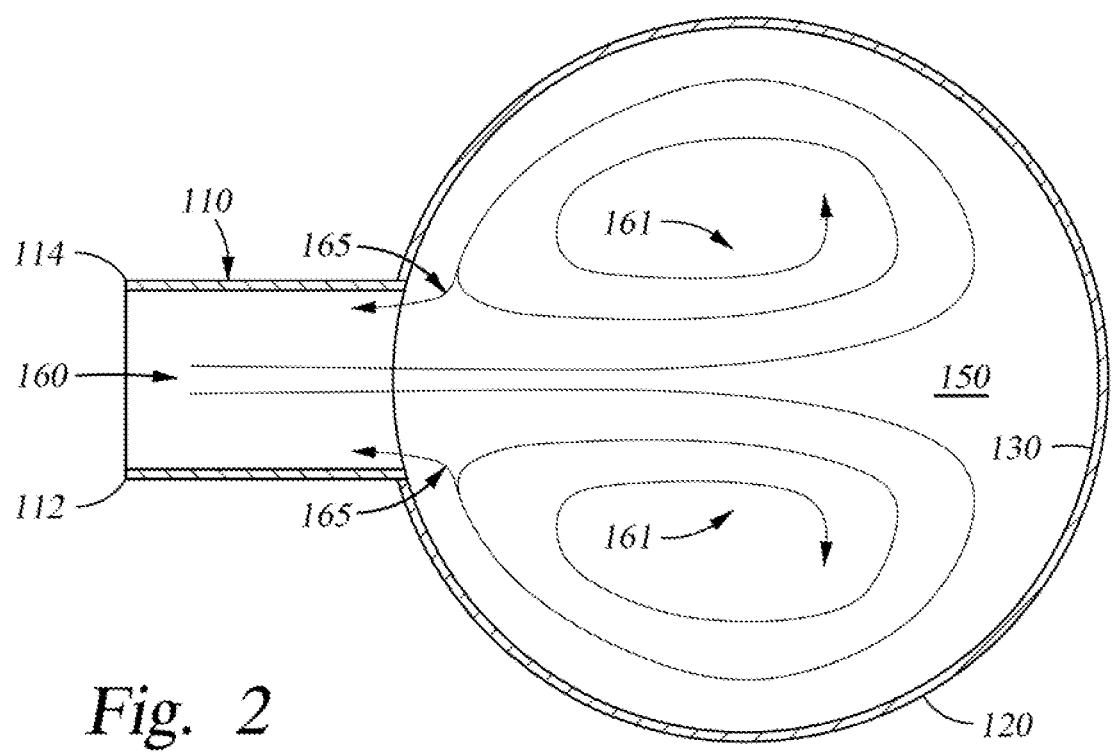
FIG. 2 is a cross-sectional view of a fractionator of the FCC unit of FIG. 1 taken along line A-A illustrating the flow of hydrocarbon vapor without baffles.

FIG. 2 is a cross-sectional view of the fractionator 100 without baffles taken along line A-A of FIG. 1, illustrating the flow of the effluent vapor 160. The effluent vapor 160 flows through the reactor vapor feed nozzle 110 and into the feed zone 150 of the fractionator 100. The flow of effluent vapor 160 impacts the inner surface 130 of the fractionator 100 directly across from the reactor vapor feed nozzle 110 and creates a swirling flow 161 within the feed zone 150. In the absence of baffles, some of the effluent vapor 160 may condense and flow back into and impinge on the reactor vapor feed nozzle 110 as shown by arrows 165. In addition, or alternatively, the condensed effluent vapor 160 may flow down along the portion of the inner surface 130 located above the reactor vapor feed nozzle 110 and flow into the open face of the reactor vapor feed nozzle 110. The back flow or down flow of condensed effluent vapor 160 causes coking at the reactor vapor feed nozzle 110, such as along a right side 112 and a left side 114 of the reactor vapor feed nozzle 110. This coking obstructs the flow of the effluent vapor 160 into the fractionator 100 and creates a low velocity zone at the reactor vapor feed nozzle 110 where entrained liquid can experience high residence time and further increase coke formation.

Figure 3:
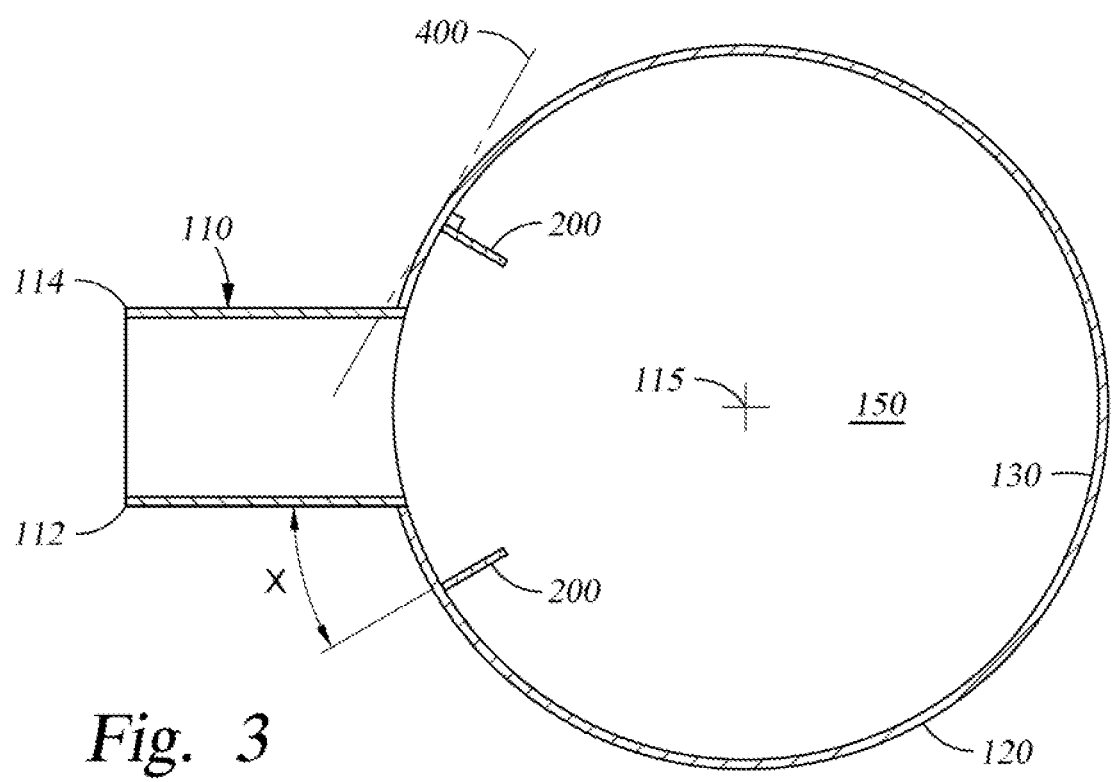
FIG. 3 is a cross-sectional view of the fractionator of the FCC unit of FIG. 1 with baffles, according to one embodiment.

FIG. 3 is a cross-sectional view of a portion of the fractionator 100 with a pair of baffles 200, according to one embodiment. The baffles 200 are coupled to the inner surface 130 of the fractionator 100 by any suitable method, for example welding. The baffles 200 are oriented towards the center 115 of the fractionator 100. The baffles 200 are shown oriented perpendicular to the tangential line 400 of the outer circumference of the fractionator 100. One baffle 200 is positioned adjacent to the right side 112 of the reactor vapor feed nozzle 110, and the other baffle 200 is positioned adjacent to the left side 114 of the reactor vapor feed nozzle 110. Each baffle 200 may be spaced a circumferential distance from the reactor vapor feed nozzle 110 by a sweep angle X within a range of about 5 degrees to about 60 degrees.

Figure 4:
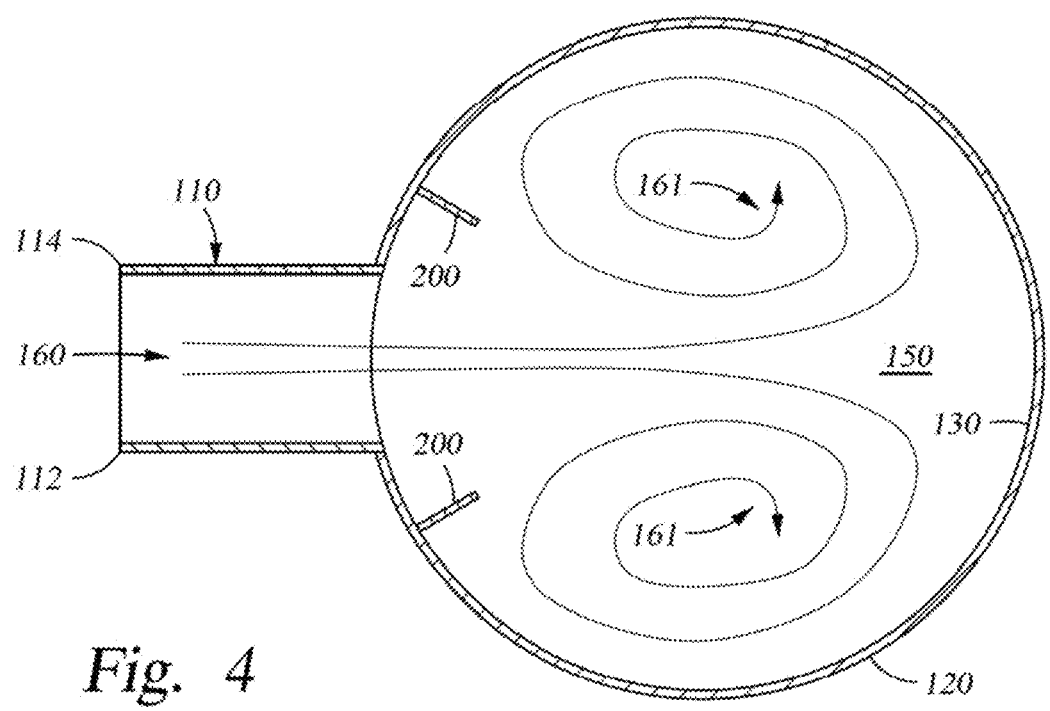
FIG. 4 is a cross-sectional view of the fractionator of FIG. 3 illustrating the flow of hydrocarbon vapor with baffles.

FIG. 4 is the same cross-sectional view of the fractionator 100 of FIG. 3 illustrating the flow of the effluent vapor 160 with the baffles 200. The addition of baffles 200 in the fractionator 100 allows the flow of the effluent vapor 160 to continue in the swirling flow 161 while also preventing and/or blocking any effluent vapor 160 and/or condensation of the effluent vapor 160 from flowing back into the reactor vapor feed nozzle 110. The baffles 200 help contain the effluent vapor 160 in the feed zone 150 and prevent flow back into the reactor vapor feed nozzle 110, thereby preventing coke build up in the reactor vapor feed nozzle 110.

Figure 5:
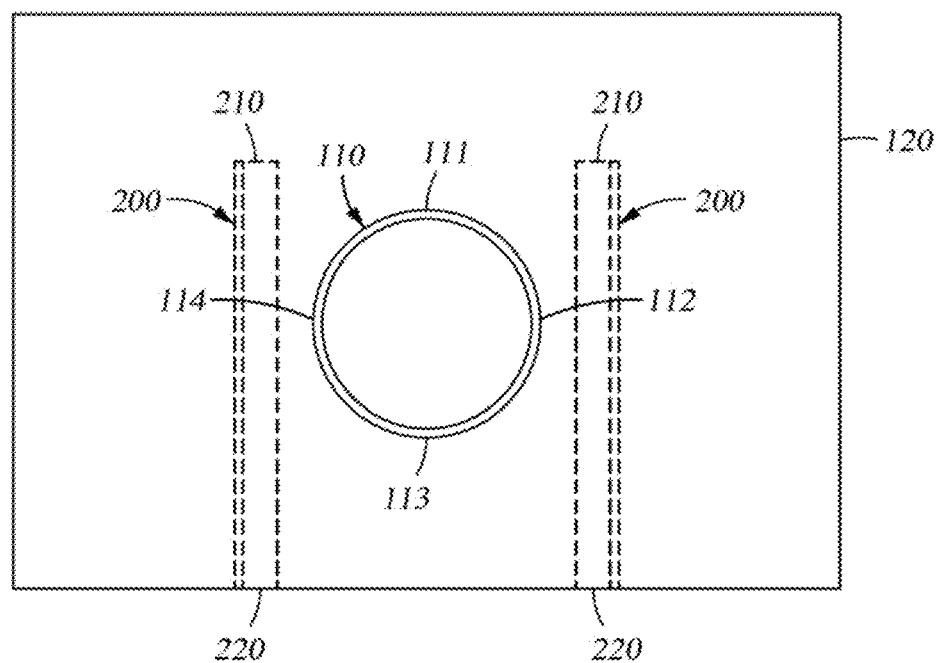
FIG. 5 is a front view of a portion of the fractionator of FIG. 3.
Figure 6:
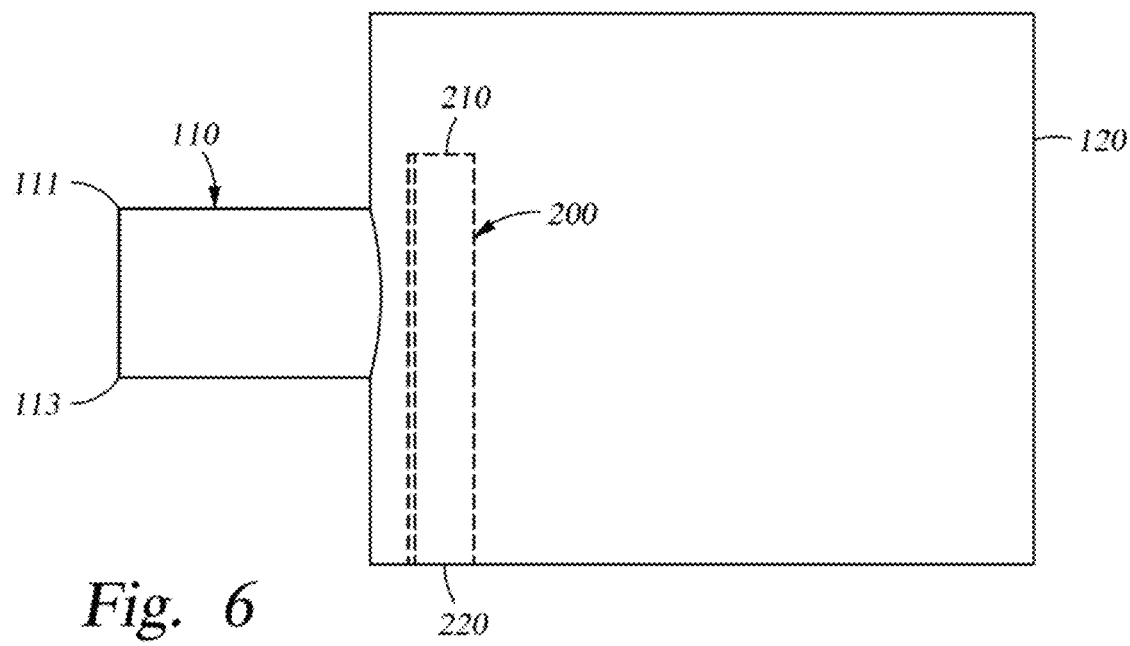
FIG. 6 is a side view of the portion of the fractionator of FIG. 3.
Figure 7:
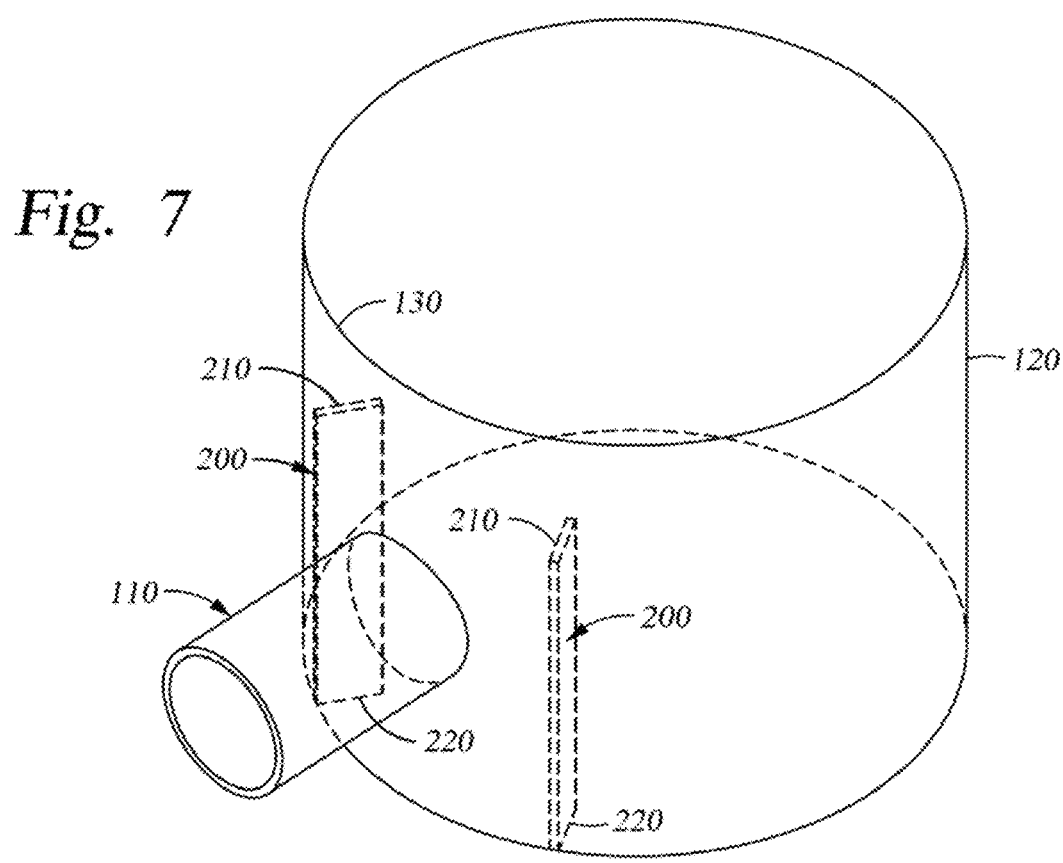
FIG. 7 is an isometric view of the portion of the fractionator of FIG. 3.

FIGS. 5, 6, and 7 are front, side, and isometric views, respectively, of the portion of the fractionator 100 of FIG. 3 further illustrating the position of the baffles 200 relative to the reactor vapor feed nozzle 110 and the fractionator 100. In one embodiment, the baffles 200 comprise rectangular-shaped plates. The baffles 200 are oriented vertically along the inner surface 130 of the fractionator 100 such that the longitudinal axis of the baffles 200 is parallel to the longitudinal axis of the fractionator 100. The baffles 200 are positioned on opposite sides of the reactor vapor feed nozzle 110. Each baffle 200 is pointing toward the center of the fractionator 100. The length of each baffle 200 is greater than the diameter of the reactor vapor feed nozzle 110. Each baffle is located relative to the reactor vapor feed nozzle 110 such that a top end 210 of the baffle 200 is positioned higher than the top end 111 of the reactor vapor feed nozzle 110 and such that a bottom end 220 of each baffle 200 is positioned lower than the bottom end 113 of the reactor vapor feed nozzle 110.

FIGS. 8, 9, 10, and 11 are cross-sectional, front, side, and isometric views, respectively, of the portion of the fractionator 100 of FIG. 1 with a pair of baffles 200, according to another embodiment. In this embodiment, the baffles 200 are parallel to each other and oriented in a direction parallel to the longitudinal axis of the reactor vapor feed nozzle 110. The baffles 200 are coupled to the inner surface 130 of the fractionator 100 such that the longitudinal axis of the baffles 200 forms an angle A relative to the center 115 of the fractionator 100 along a radial line 180. The angle A may be within a range of about 0 degrees to about 45 degrees. The angle A at which one of the baffles 200 is oriented can be the same as or different from the angle A at which the other baffle 200 is oriented.

Figure 12:
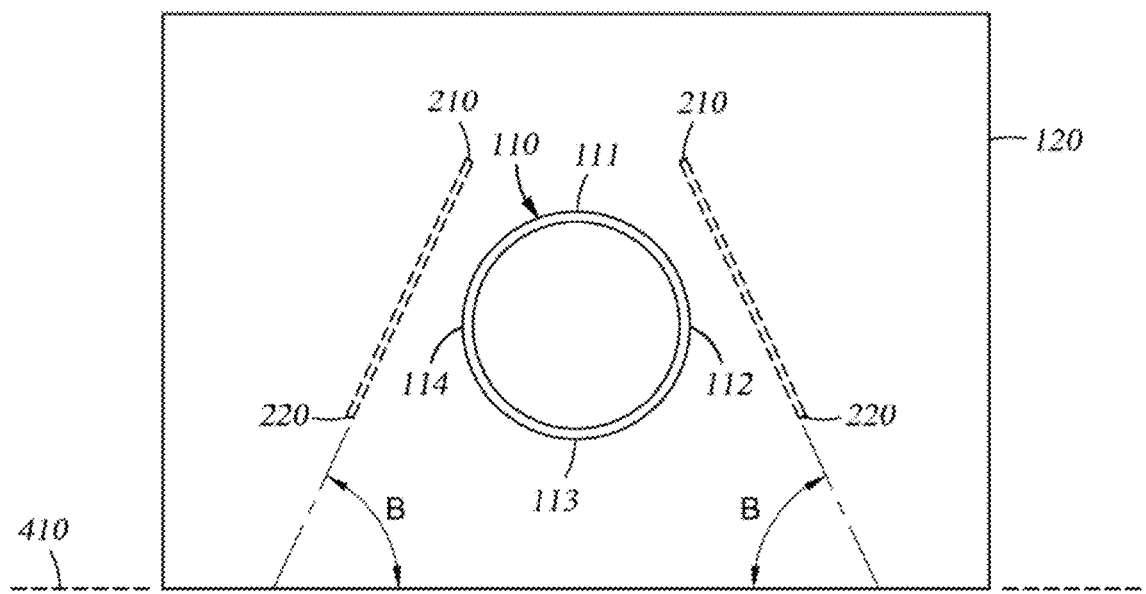
FIG. 12 is a front view of a portion of the fractionator of FIG. 1, according to another embodiment.
Figure 13:
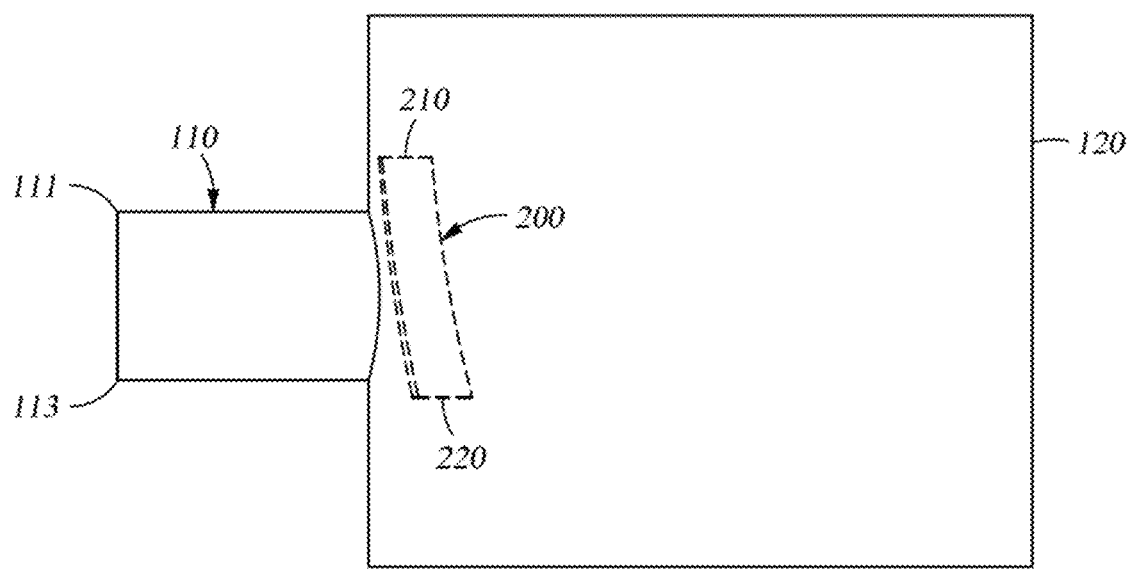
FIG. 13 is a side view of the portion of the fractionator of FIG. 12.
Figure 14:
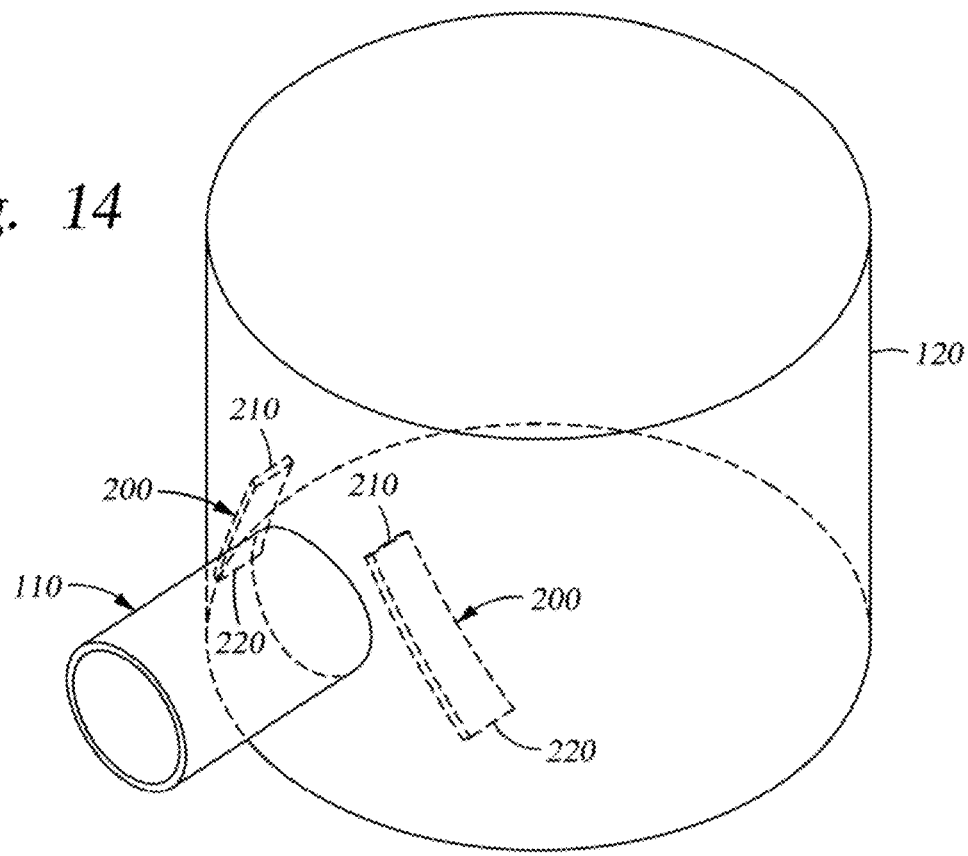
FIG. 14 is an isometric view of the portion of the fractionator of FIG. 12.

FIGS. 12, 13, and 14 are front, side, and isometric views, respectively, of the portion of the fractionator 100 of FIG. 1 with a pair of baffles 200, according to another embodiment. In this embodiment, the baffles 200 are slanted such that the top ends 210 of the baffles 200 are closer to the reactor vapor feed nozzle 110 than the bottom ends 220 of the baffles 200. The baffles 200 are coupled to the inner surface 130 of the fractionator 100 such that the longitudinal axis of the baffles 200 forms an angle B relative to the horizontal axis 410. The angle B may be within a range of about 0 degrees to about 45 degrees. The angle B at which one of the baffles 200 is oriented can be the same as or different from the angle B at which the other baffle 200 is oriented.

Figure 15:
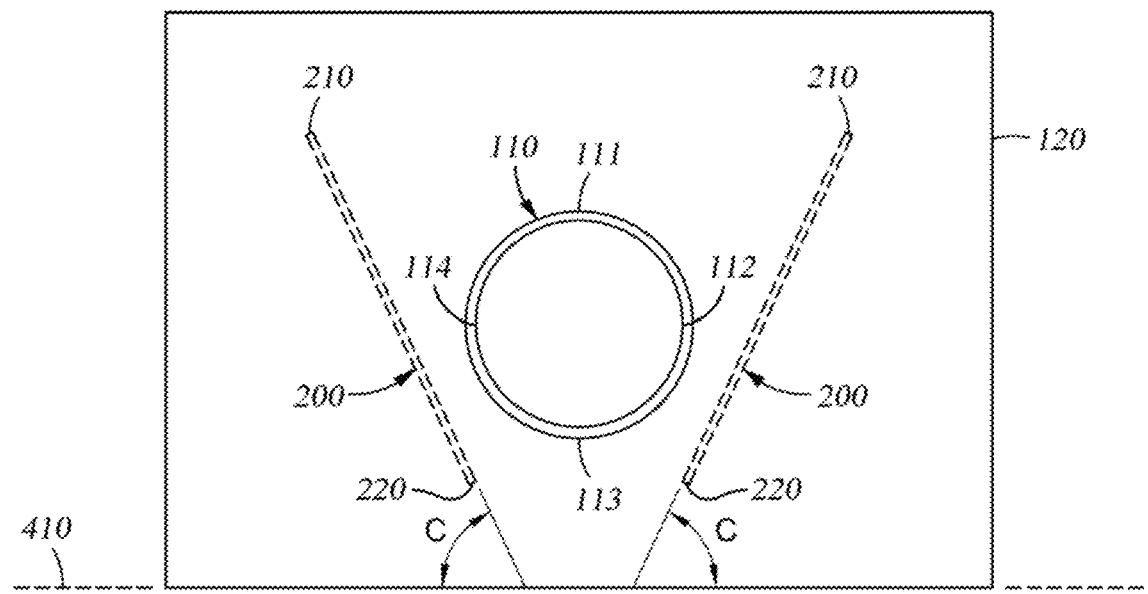
FIG. 15 is a front view of a portion of the fractionator of FIG. 1, according to another embodiment.
Figure 16:
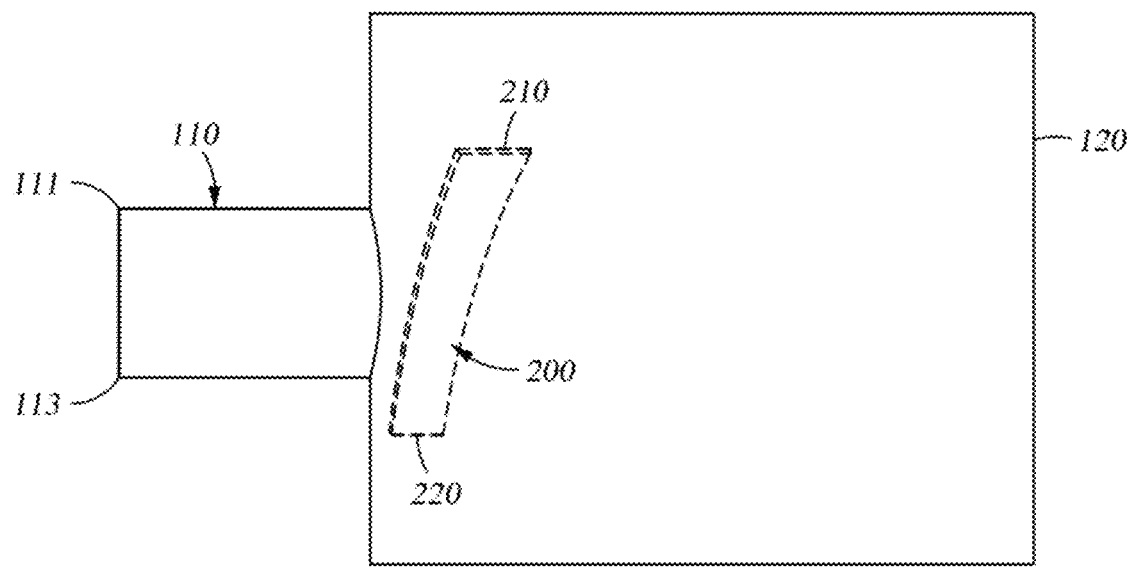
FIG. 16 is a side view of the portion of the fractionator of FIG. 15.
Figure 17:
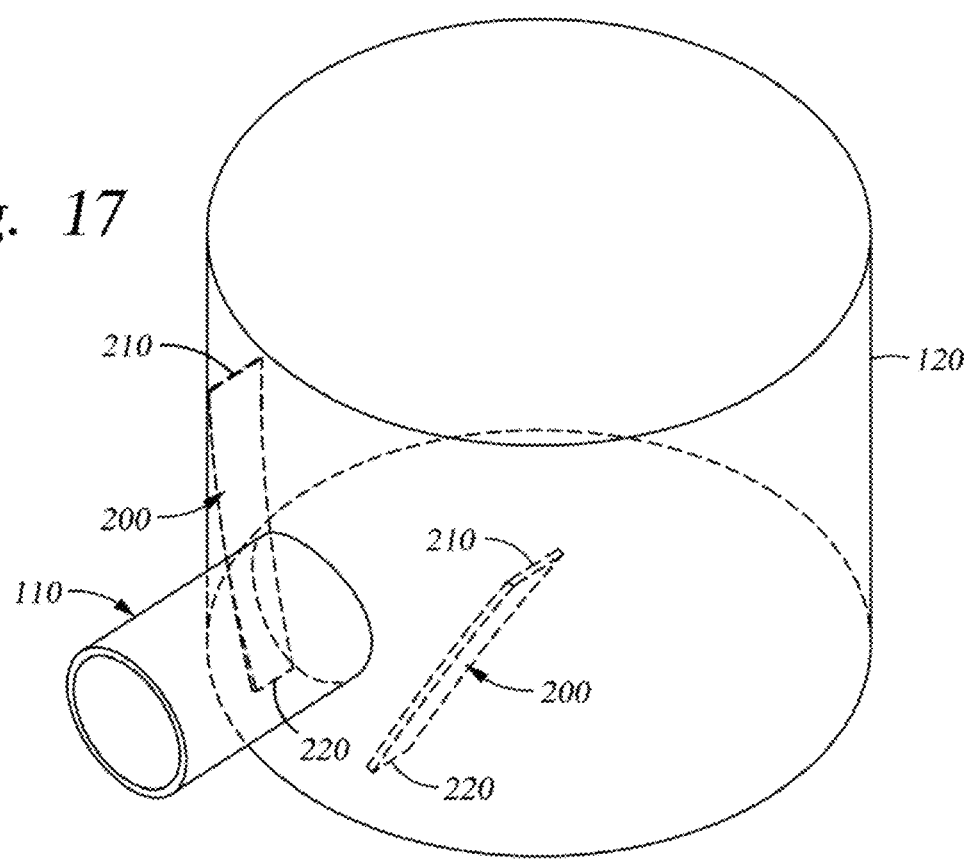
FIG. 17 is an isometric view of the portion of the fractionator of FIG. 15.

FIGS. 15, 16, and 17 are front, side, and isometric views, respectively, of the portion of the fractionator 100 of FIG. 1 with a pair of baffles, according to another embodiment. In this embodiment, the baffles 200 are slanted such that the bottom ends 220 of the baffles 200 are closer to the reactor vapor feed nozzle 110 than the top ends 210 of the baffles 200. The baffles 200 are coupled to the inner surface 130 of the fractionator 100 such that the longitudinal axis of the baffles 200 forms an angle C relative to the horizontal axis 410. The angle C may be within a range of about 0 degrees to about 45 degrees. The angle C at which one of the baffles 200 is oriented can be the same as or different from the angle C at which the other baffle 200 is oriented.

Figure 18:
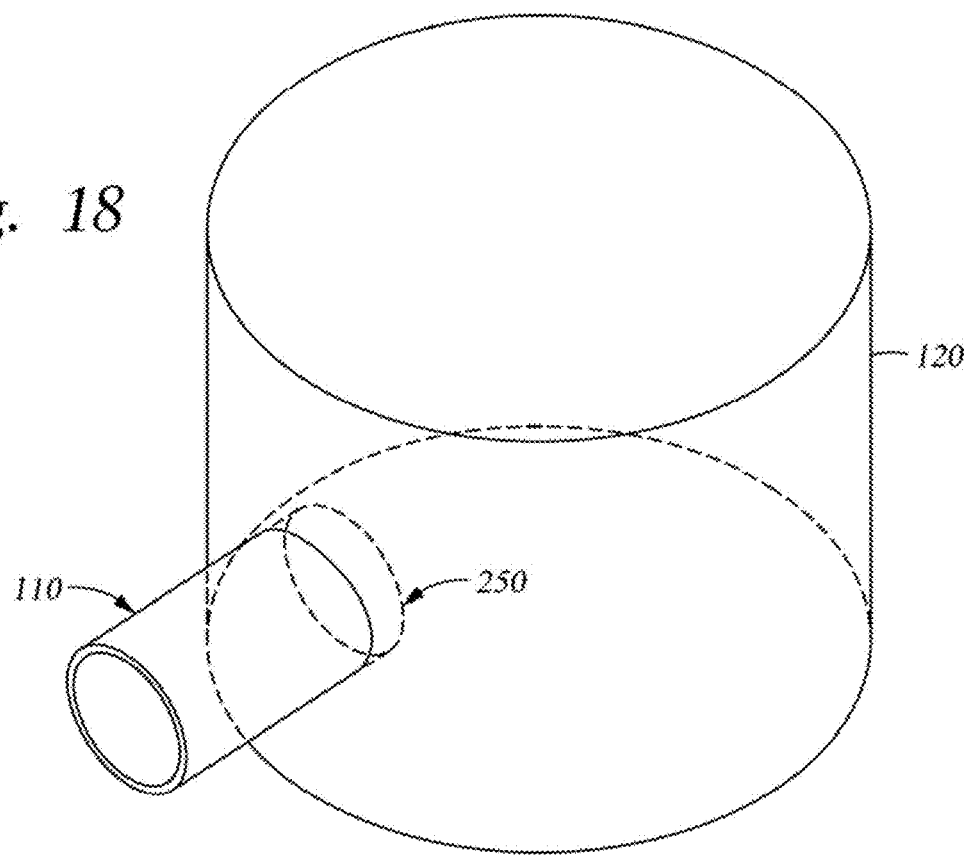
FIG. 18 is an isometric view of a portion of the fractionator of FIG. 1, according to another embodiment.
Figure 19:
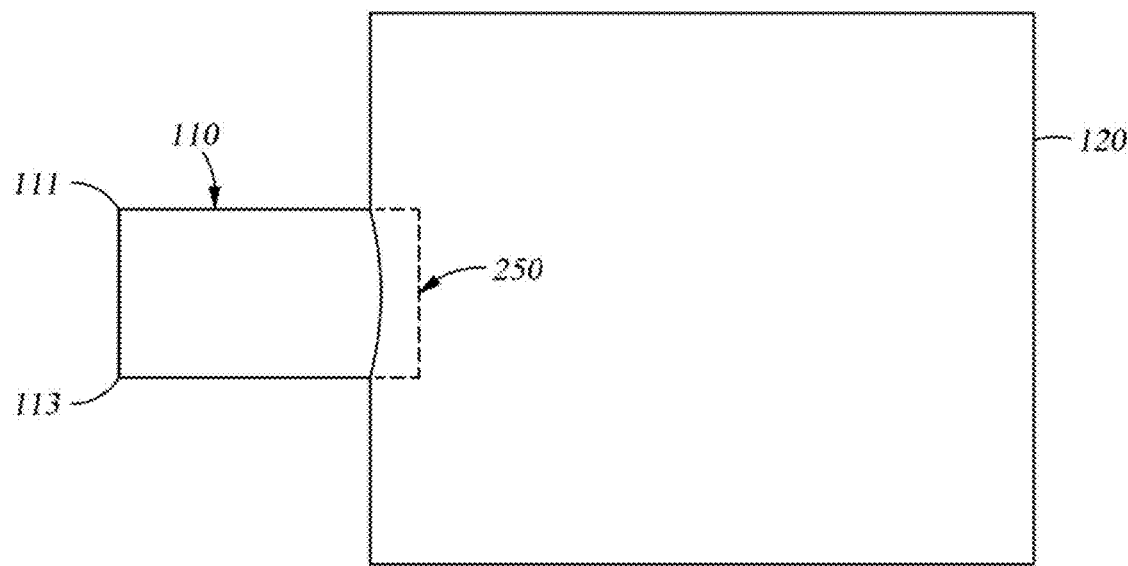
FIG. 19 is a side view of the portion of the fractionator of FIG. 18.

FIGS. 18 and 19 are isometric and side views, respectively, of a portion of the fractionator 100 of FIG. 1, according to another embodiment. In this embodiment, the reactor vapor feed nozzle 110 partially extends into the interior of the fractionator 100 such that the end of the reactor vapor feed nozzle 110 forms an annular baffle 250 that prevents condensed effluent vapor 160 from flowing back into the reactor vapor feed nozzle 110. The portion of the reactor vapor feed nozzle 110 that extends into the interior of the fractionator 100 and forms the annular baffle 250 can be any suitable length, for example 6 inches or more.

Figure 8:
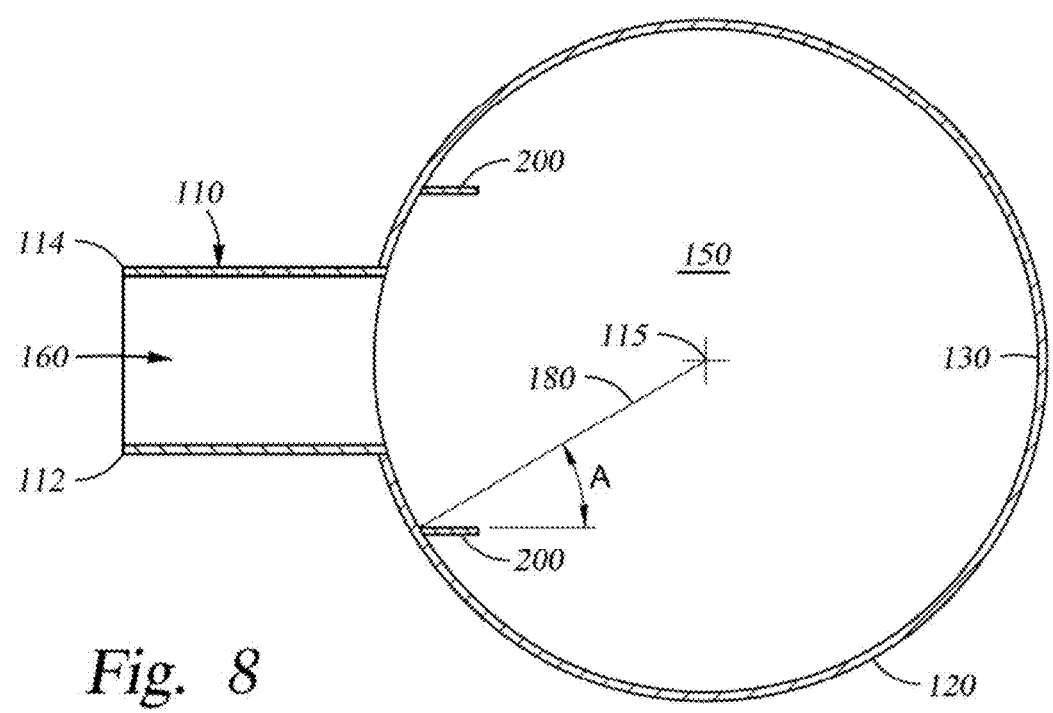
FIG. 8 is a cross-sectional view of the fractionator of FIG. 1 with baffles, according to another embodiment.
Figure 9:
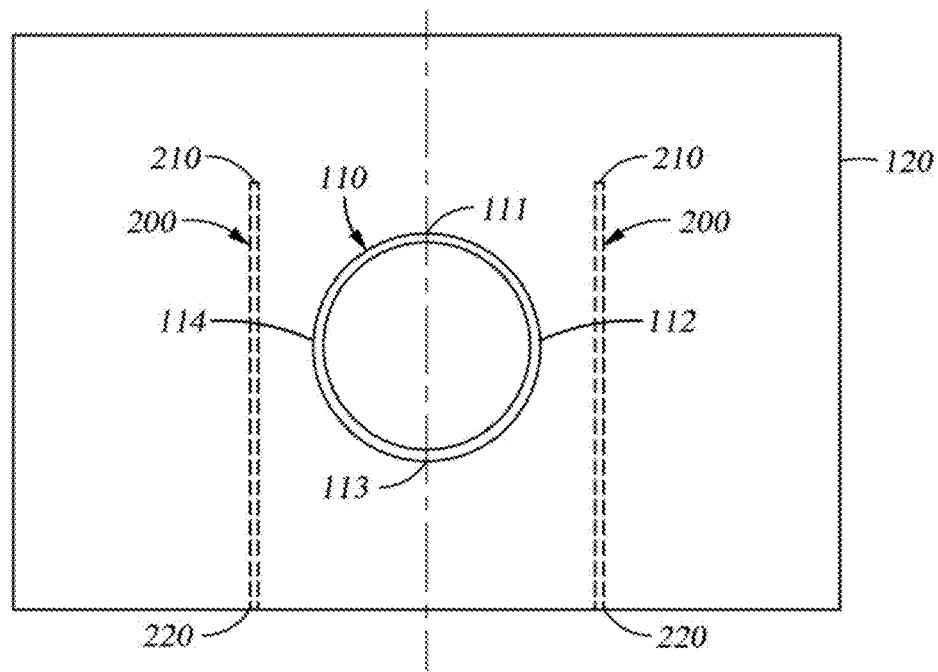
FIG. 9 is a front view of a portion of the fractionator of FIG. 8.
Figure 10:
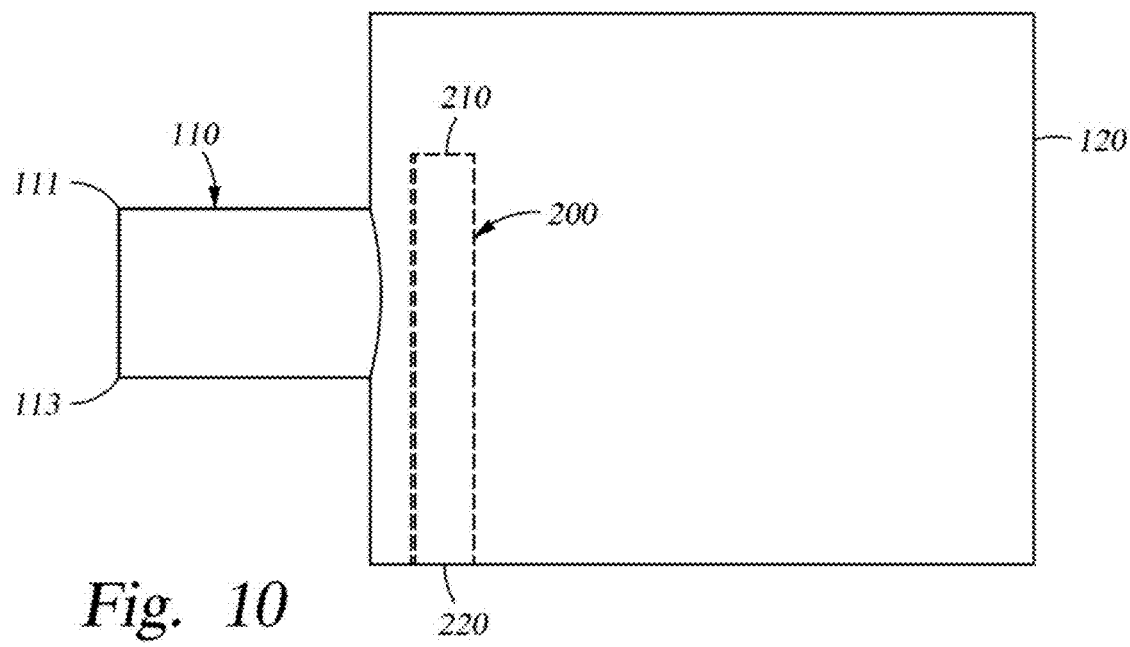
FIG. 10 is a side view of the portion of the fractionator of FIG. 8.
Figure 11:
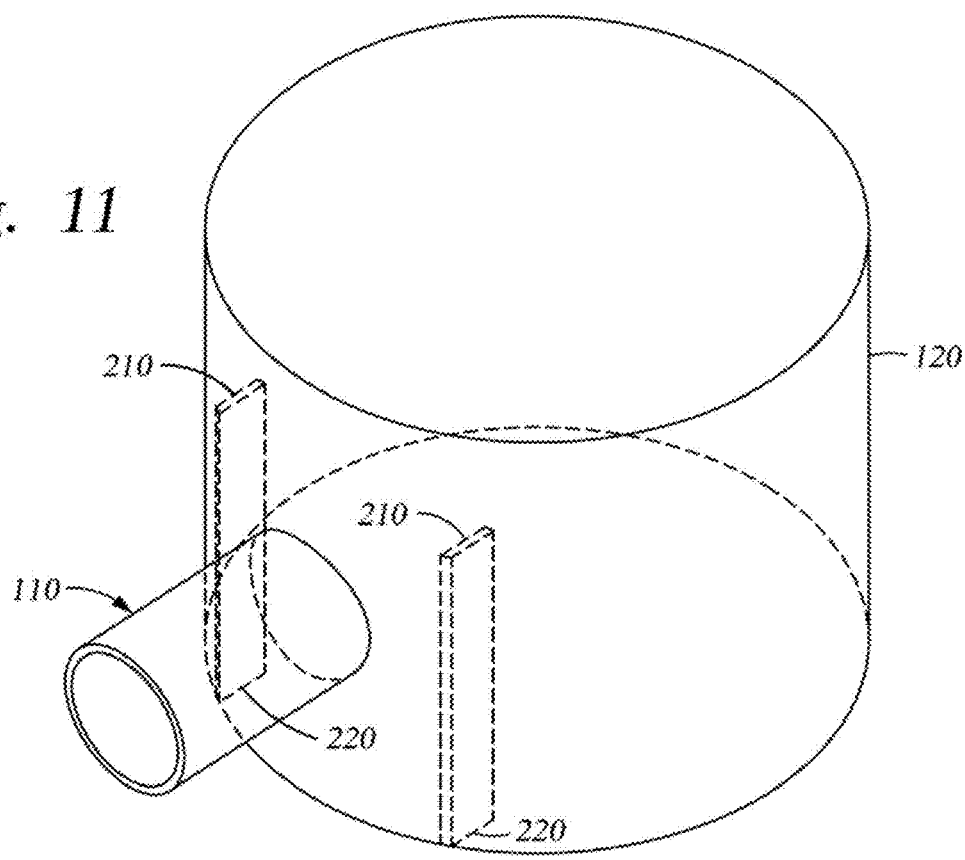
FIG. 11 is an isometric view of the portion of the fractionator of FIG. 8.
Figure 20:
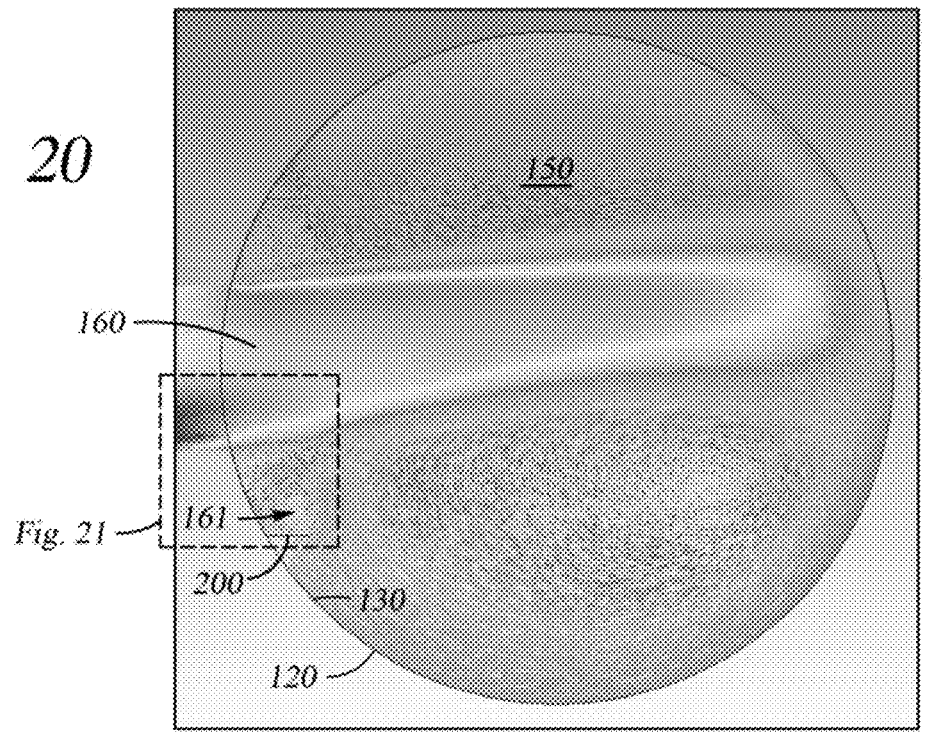
FIG. 20 is a computer-generated fluid dynamic image of the velocity flow of hydrocarbon vapor flowing into the fractionator with the baffles as shown in of FIG. 8.
Figure 21:
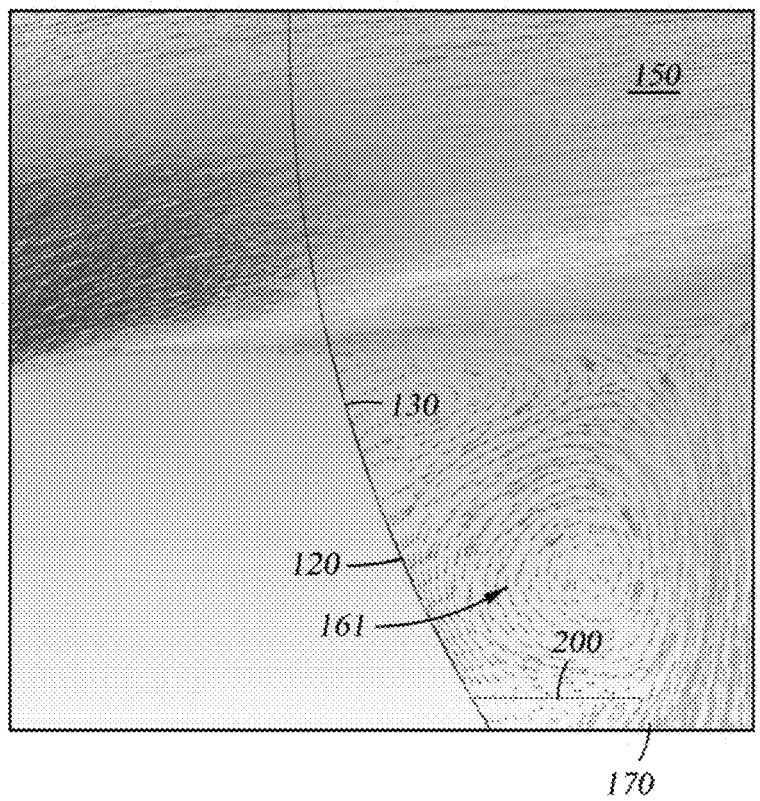
FIG. 21 is an enlarged view of a portion of FIG. 20 where the flow of hydrocarbon vapor comes in contact with a baffle.

FIG. 20 is a computer-generated fluid dynamic image of the velocity flow of effluent vapor flowing into the fractionator 100 with the baffles as shown in FIG. 8. FIG. 21 is an enlarged view of a portion of FIG. 20 where the flow of the effluent vapor 160 comes in contact with one of the baffles 200. The velocity of the flow of the effluent vapor 160 is at its highest in the red region, generally located in the center of the feed zone 150. The orange region represents a velocity of the flow of the effluent vapor 160 that is less than the red region. The color blue represents a velocity of the flow of the effluent vapor 160 that is less than the orange region. The color green represents a velocity of the flow of the effluent vapor 160 that is less than the blue region. The velocity of the flow of the effluent vapor 160 is at its lowest in the green region. The velocity of the flow of the effluent vapor 160 across all colored regions may be within a range of about 70 feet per second to about 140 feet per second. The baffles 200 help contain the effluent vapor 160 within the feed zone 150 as shown by the swirling flow 161 of the effluent vapor 160 adjacent to the baffle 200. The contact of the effluent vapor 160 with the baffle 200 blocks, redirects, and reduces the velocity of the flow of the effluent vapor 160 in the area next to the reactor vapor feed nozzle 110, thereby preventing flow back of condensed effluent vapor 160 into the reactor vapor feed nozzle 110.

Figure 22:
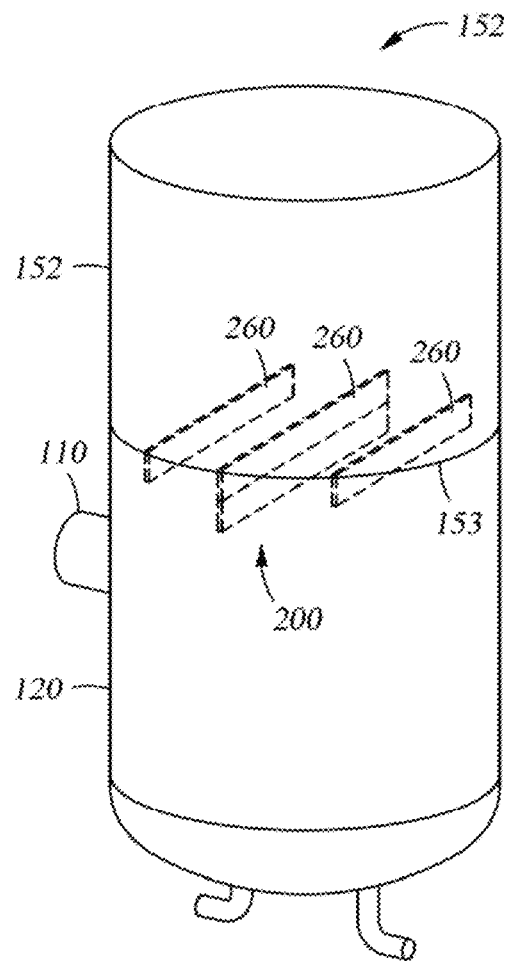
FIG. 22 is an isometric view of a portion of the fractionator of FIG. 1, according to another embodiment.

FIG. 22 is an isometric view of a portion of the fractionator of FIG. 1, according to another embodiment. A plurality of beams 260 are coupled to a support member 153 disposed between the feed zone 150 and one of the one or more packed or tray sections 152, which may include a slurry pumparound. One or more baffles 200 are coupled to the center beam 260, although the one or more baffles 200 can be coupled to any one or all of the plurality beams 260. The support member 153 is disposed at a bottom end of one of the one or more packed or tray sections 152, which are configured to condense, fractionate, distillate, and/or collect specific portions of the effluent vapor 160 as it flows up through the packed or tray sections. In one embodiment, the baffles 200 may be coupled directly to the support member 153 in addition to and/or as an alternative to being coupled to the plurality of beams 260. In one embodiment, the baffles 200 may be coupled to the inner surface 130 of the feed zone 150.

Figure 23:
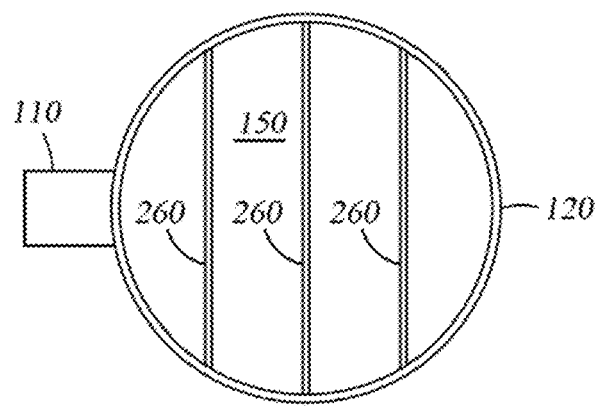
FIG. 23 is a top view of the portion of the fractionator of FIG. 22.

In this embodiment, the plurality of beams 260 and the baffle 200 are disposed perpendicular to the flow of effluent vapor 160 from the reactor vapor feed nozzle 110. Although one baffle 200 is pictured herein, a plurality of baffles may be coupled to any one of the plurality of beams 260. FIG. 23 is a top view of the portion of the fractionator of FIG. 22 demonstrating a position of the plurality of beams 260 within the feed zone 150 according to one embodiment. The beams 260 deflect the effluent vapor 160 flow downward and disrupt the recirculation of the effluent vapor 160. Disrupting the recirculation of the effluent vapor 160 decreases the amount of effluent vapor 160 and/or condensed effluent vapor 160 that is pushed back toward the reactor vapor feed nozzle 110.

Figure 24:
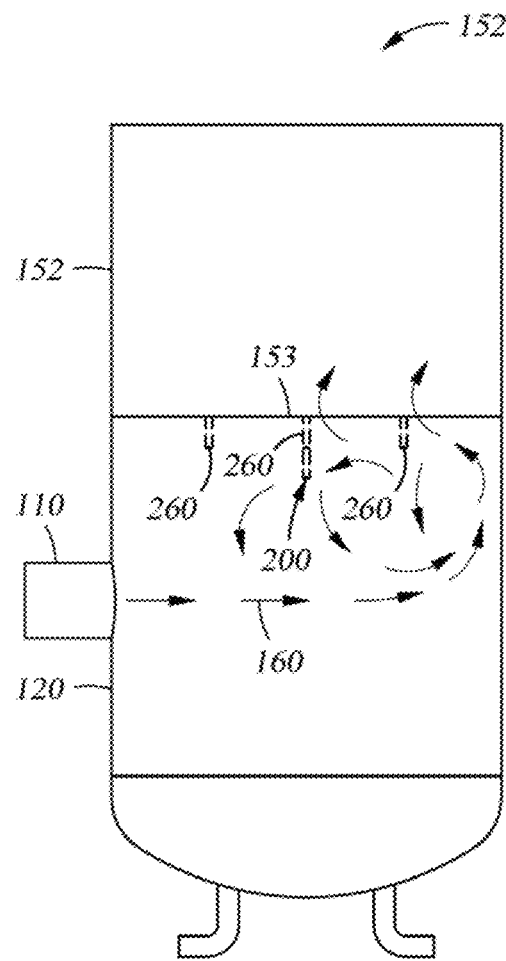
FIG. 24 is a side view of the portion of the fractionator of FIG. 22 illustrating the flow of hydrocarbon vapor.

FIG. 24 is a side view of the portion of the fractionator of FIG. 22 demonstrating the flow of effluent vapor 160 against the plurality of beams 260 and baffle 200. The one or more baffles 200 block the recirculation of the flow of effluent vapor 160 along the support member 153 into the reactor vapor feed nozzle 110, which prevents the effluent vapor 160 and/or condensed effluent vapor 160 from flowing back into the reactor vapor feed nozzle 110.

Figure 25:
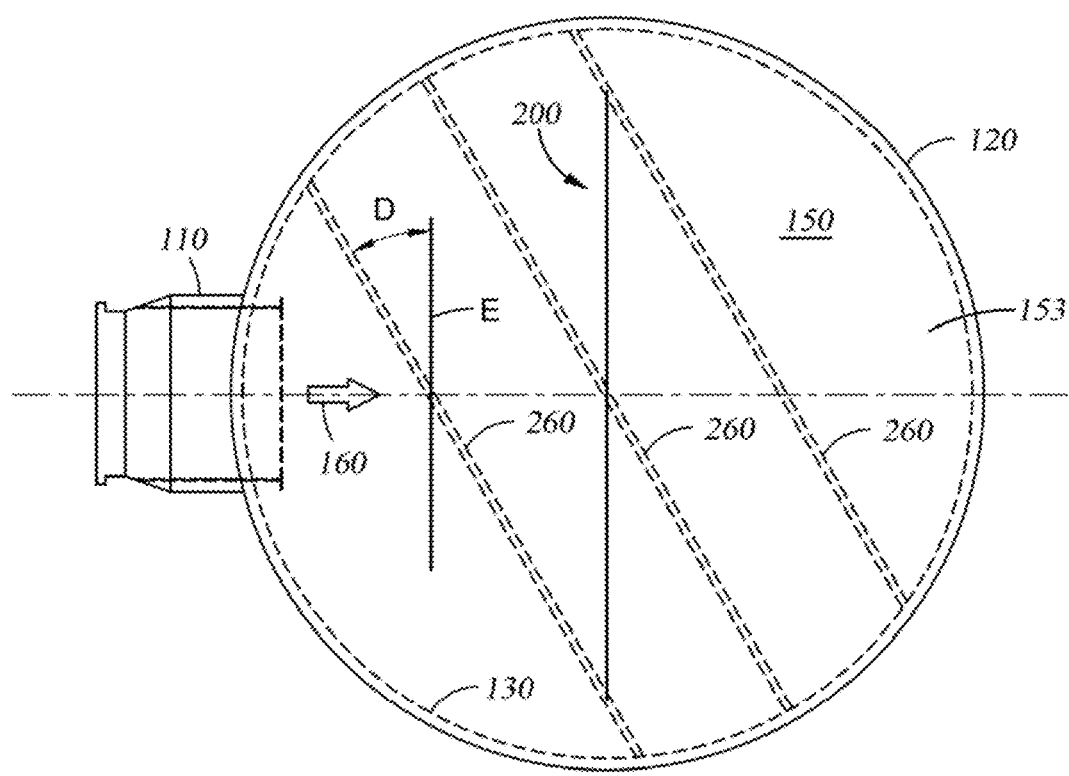
FIG. 25 is a top view of a portion of the fractionator of FIG. 1, according to another embodiment.

FIG. 25 is a top view of a portion of the fractionator of FIG. 1, according to another embodiment. In this embodiment, the plurality of beams 260 coupled to the support member 153 are disposed at an angle D relative to an axis (illustrated by line "E") that is perpendicular with the flow of effluent vapor 160 through the reactor vapor feed nozzle 110. The plurality of beams 260 are parallel to each other. The angle D may be any suitable angle, for example from 0 degrees to 30 degrees.

In this embodiment, a baffle 200 is disposed perpendicular to the flow of effluent vapor 160 through the reactor vapor feed nozzle 110. The baffle 200 also forms angle D with the plurality of beams 260. The baffle 200 pictured is shorter than the diameter of the feed zone 150 and does not reach the inner surface 130 of the feed zone 150, but the baffle 200 may extend to the inner surface 130 of the feed zone 150 in other embodiments. In another embodiment, a plurality of baffles may be coupled to the plurality of beams 260 at angle D.

Figure 26:
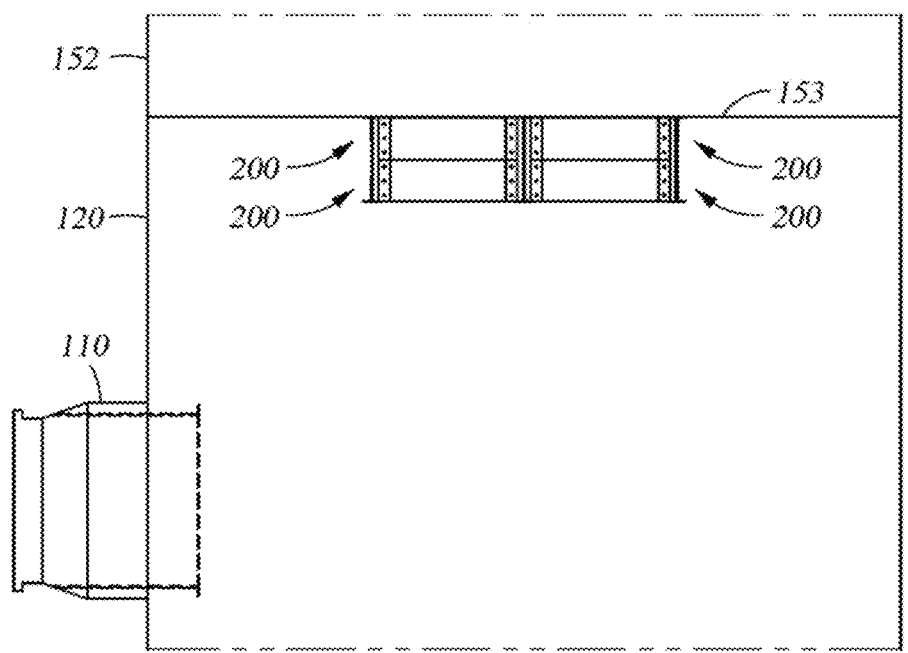
FIG. 26 is a side view of a portion of the fractionator of FIG. 25, according to another embodiment.

FIG. 26 is a side view of a portion of the fractionator of FIG. 1, according to another embodiment. In this embodiment, a plurality of baffles 200 is disposed at the support member 153. In this embodiment, the plurality of baffles 200 are coupled to one another, and the baffles 200 located closest to the top of the feed zone 150 are coupled to the upper wall of the feed zone. The baffles 200 may be coupled through any suitable method, for example welding, for example bolting.

Figure 27:
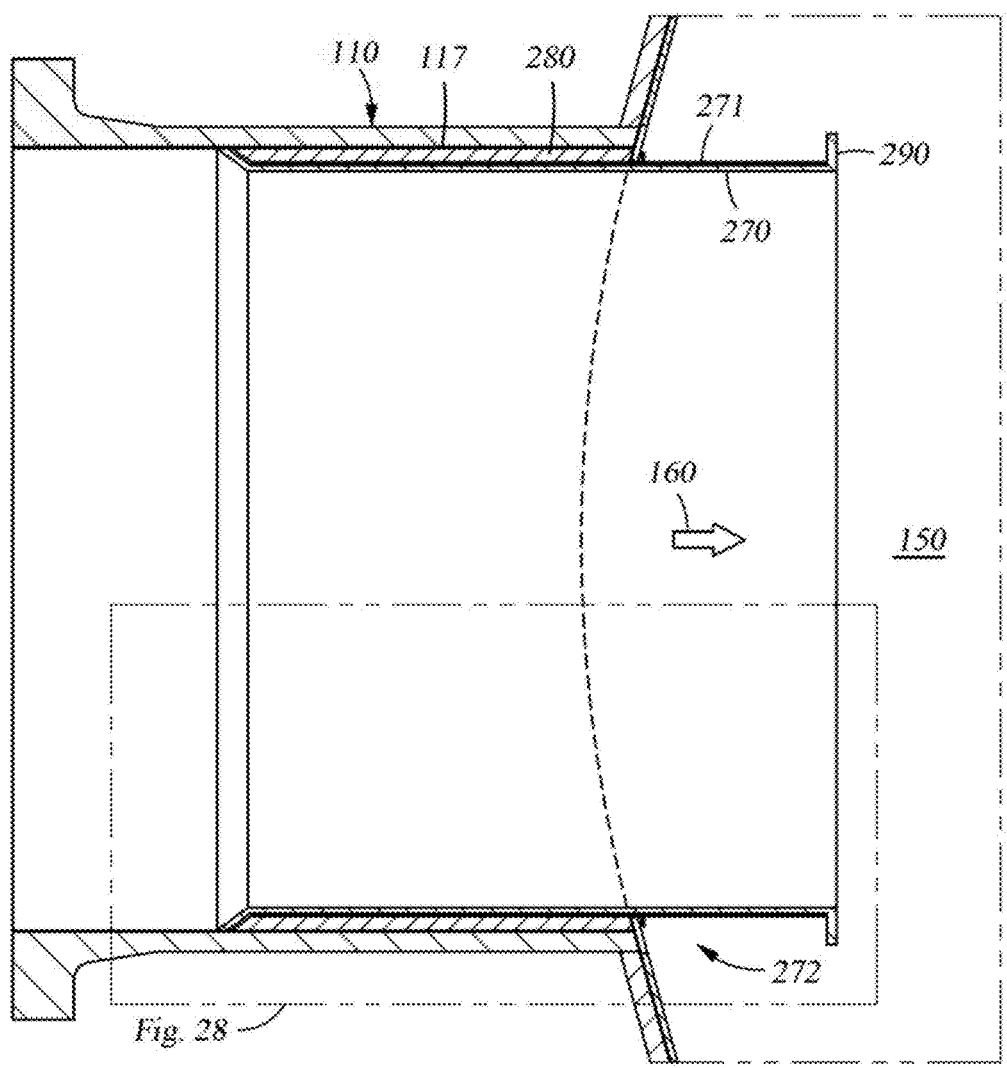
FIG. 27 is a sectional view of a reactor vapor feed nozzle of the fractionator of FIG. 25, according to one embodiment.

FIG. 27 is a side view of the reactor vapor feed nozzle 110, and FIG. 28 is an enlarged view of a portion of the reactor vapor feed nozzle 110 of FIG. 27, according to one embodiment. In this embodiment, an internal nozzle 272 is coupled to the reactor vapor feed nozzle 110, which acts at least partially as a baffle. The internal nozzle 272 comprises a cylindrical tube 270 disposed within the reactor vapor feed nozzle 110. A portion of the internal nozzle 272 extends into the interior of the feed zone 150 any suitable length, for example 6 inches or more. The internal nozzle 272 acts as a baffle (similar to the annular baffle 250 illustrated in FIG. 18) blocking and redirecting effluent flow from flowing back into the reactor vapor feed nozzle 110. The cylindrical tube 270 includes an outer diameter smaller than an inner diameter of the reactor vapor feed nozzle 110 such that the cylindrical tube 270 may be disposed within the reactor vapor feed nozzle 110. The outer diameter of the cylindrical tube 270 may be of a size such that a region is disposed between the outer wall 271 of the cylindrical tube 270 and the inner wall 117 of the reactor vapor feed nozzle 110. The region formed between the outer wall 271 of the cylindrical tube 270 and the inner wall 117 of the reactor vapor feed nozzle 110 may be filled partially or completely with a refractory material 280. The refractory material 280 is an insulating material to maintain the temperature of the effluent vapor 160 and prevent the effluent vapor 160 from partially condensing into a liquid prior to flowing into the feed zone 150.

An annular lip 290 may be formed on (or alternatively coupled to) the end of the cylindrical tube 270 located within the feed zone 150. The annular lip 290 is formed at a perpendicular orientation to the flow of effluent vapor 160 through the reactor vapor feed nozzle 110 to the feed zone 150. The annular lip 290 may be any width, for example from about 2 inches to about 6 inches, for example 3 inches. The width of the annular lip 290 is measured from the outer wall 271 of the cylindrical tube 270 at a perpendicular orientation to the flow of the effluent vapor 160. The portion of the internal nozzle 272 that extends into the feed zone 150, as well as the annular lip 290, prevents the condensed effluent vapor 160 from flowing back into the reactor vapor feed nozzle 110. The portion of the internal nozzle 272 that extends into the feed zone 150 allows condensed effluent vapor 160 flowing down along the inner surface 130 of the feed zone 150 to flow around the reactor vapor feed nozzle 110 without impinging on the open nozzle face. The annular lip 290 causes the condensed effluent vapor 160 to flow around the sides of the reactor vapor feed nozzle 110 rather than over the end of the reactor vapor feed nozzle 110 where the condensed effluent vapor 160 would encounter the path of the effluent vapor 160 entering the feed zone 150.

In another embodiment, the internal nozzle 272 comprises an extension of the existing reactor vapor feed nozzle 110 (similar to the annular baffle 250 illustrated in FIG. 18). In this embodiment, the annular lip 290 may be formed on or coupled to the extension of the existing reactor vapor feed nozzle 110. Also in this embodiment, the refractory material 280 may be disposed on the internal wall of the extension portion of the reactor vapor feed nozzle 110.

Any of the embodiments recited above may be combined, in whole or part, with any of the other embodiments recited above. It will be appreciated by those skilled in the art that the preceding embodiments are exemplary and not limiting. It is intended that all modifications, permutations, enhancements, equivalents, and improvements thereto that are apparent to those skilled in the art upon a reading of the specification and a study of the drawings are included within the scope of the disclosure. It is therefore intended that the following appended claims may include all such modifications, permutations, enhancements, equivalents, and improvements.

While the foregoing is directed to embodiments of the present disclosure, other and further embodiments of the disclosure may be devised without departing from the basic scope thereof, and the scope thereof is determined by the claims that follow.

We claim:

1. An apparatus for fluid catalytic cracking, comprising:
a fractionator column having a feed zone;
a radially-oriented reactor vapor feed nozzle coupled to the fractionator column to direct fluid vapor flow into the feed zone, wherein a portion of the reactor vapor feed nozzle extends into the feed zone;

an annular lip formed on the reactor vapor feed nozzle at a perpendicular orientation to the fluid vapor flow through the reactor vapor feed nozzle to the feed zone; and one or more baffles suspended within the fractionator column above the reactor vapor feed nozzle at a perpendicular orientation to the fluid vapor flow through the reactor vapor feed nozzle to the feed zone, wherein the portion of the reactor vapor feed nozzle that extends into the feed zone, the annular lip, and the one or more baffles are positioned relative to one another in a manner that prevents fluid vapor flow back into the reactor vapor feed nozzle.

2. The apparatus of claim 1, further comprising:
one or more additional baffles coupled to an inner surface of the fractionator column, wherein the one or more additional baffles are spaced a circumferential distance from the reactor vapor feed nozzle defined by a sweep angle of 5 degrees to 60 degrees.

3. The apparatus of claim 1, further comprising:
one or more additional baffles coupled to an inner surface of the fractionator column, wherein the one or more additional baffles are vertically oriented and extend into the feed zone in a radial direction.

4. The apparatus of claim 1, further comprising:
one or more additional baffles coupled to an inner surface of the fractionator column, wherein the one or more additional baffles are vertically oriented and extend into the feed zone in a direction offset from a radial line of the fractionator column by an angle that is between 0 degrees and 45 degrees.

5. The apparatus of claim 1, further comprising:
one or more additional baffles coupled to an inner surface of the fractionator column, wherein the one or more additional baffles are slanted from a vertical orientation relative to the reactor vapor feed nozzle.

6. The apparatus of claim 1, further comprising:
a plurality of beams coupled to a support member disposed between the feed zone and one of one or more packed or tray sections positioned above the feed zone, wherein the one or more baffles are suspended from one or more of the plurality of beams.

7. An apparatus for fluid catalytic cracking, comprising:
a fractionator column having a feed zone;
a radially-oriented reactor vapor feed nozzle coupled to the fractionator column to direct fluid vapor flow into the feed zone;
a plurality of beams coupled to a support member disposed between the feed zone and one of one or more packed or tray sections positioned above the feed zone; and
one or more baffles suspended from at least one of the plurality of beams, wherein the one or more baffles are disposed perpendicular to the fluid vapor flow from the reactor vapor feed nozzle, wherein an entirety of the one or more baffles is disposed above the reactor vapor feed nozzle to prevent fluid vapor flow back into the reactor vapor feed nozzle.

8. The apparatus of claim 7, wherein a portion of the reactor vapor feed nozzle extends into the feed zone.

9. The apparatus of claim 8, further comprising:
an annular lip formed on the reactor vapor feed nozzle at a perpendicular orientation to the fluid vapor flow through the reactor vapor feed nozzle to the feed zone.

10. The apparatus of claim 7, further comprising an internal nozzle coupled to the reactor vapor feed nozzle.

11. The apparatus of claim 10, wherein an end of the internal nozzle comprises an annular lip formed at a perpendicular orientation to the flow of fluid vapor flow through the reactor vapor feed nozzle to the feed zone.

12. The apparatus of claim 7, further comprising:
one or more additional baffles coupled to an inner surface of the fractionator column, wherein the one or more additional baffles are spaced a circumferential distance from the reactor vapor feed nozzle defined by a sweep angle of 5 degrees to 60 degrees.

13. The apparatus of claim 7, further comprising:
one or more additional baffles coupled to an inner surface of the fractionator column, wherein the one or more additional baffles are vertically oriented and extend into the feed zone in a radial direction.

14. The apparatus of claim 7, further comprising:
one or more additional baffles coupled to an inner surface of the fractionator column, wherein the one or more additional baffles are vertically oriented and extend into the feed zone in a direction offset from a radial line of the fractionator column by an angle that is between 0 degrees and 45 degrees.

15. The apparatus of claim 7, further comprising:
one or more additional baffles coupled to an inner surface of the fractionator column, wherein the one or more additional baffles are slanted from a vertical orientation relative to the reactor vapor feed nozzle.

16. The apparatus of claim 7, wherein the one or more baffles are suspended from a center beam of the plurality of beams.

17. The apparatus of claim 7, wherein the plurality of beams are disposed at a non-perpendicular angle relative to the fluid vapor flow from the reactor vapor feed nozzle to the feed zone.

18. The apparatus of claim 7, wherein the plurality of beams are disposed at a perpendicular angle relative to the fluid vapor flow from the reactor vapor feed nozzle to the feed zone.

19. The apparatus of claim 7, wherein the reactor vapor feed nozzle comprises a cylindrical internal nozzle having an annular lip and disposed within the reactor vapor feed nozzle that extends into the feed zone, and an insulating material disposed between cylindrical internal nozzle and the reactor vapor feed nozzle.

* * * * *